United States Patent
Caston et al.

(10) Patent No.: US 10,757,151 B2
(45) Date of Patent: *Aug. 25, 2020

(54) SYSTEM AND METHOD FOR AUTOMATIC MEETING NOTE CREATION AND SHARING USING A USER'S CONTEXT AND PHYSICAL PROXIMITY

(71) Applicant: Google LLC, Mountain View, CA (US)

(72) Inventors: Nicholas Trent Caston, Pyrmont (AU); Jennifer Delphine King, Forest Lodge (AU); Cayden Joel Meyer, Pyrmont (AU); Harold H W Kim, Montville, NJ (US); Xudong Yang, Pyrmont (AU)

(73) Assignee: GOOGLE LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/436,875

(22) Filed: Jun. 10, 2019

(65) Prior Publication Data

US 2019/0297124 A1    Sep. 26, 2019

Related U.S. Application Data

(63) Continuation of application No. 14/871,004, filed on Sep. 30, 2015, now Pat. No. 10,320,861.

(51) Int. Cl.
*H04L 29/06* (2006.01)
*G06Q 10/10* (2012.01)
*G06F 3/0484* (2013.01)

(52) U.S. Cl.
CPC ........ *H04L 65/403* (2013.01); *G06F 3/04842* (2013.01); *G06Q 10/101* (2013.01);
(Continued)

(58) Field of Classification Search
CPC . H04L 65/403; G06F 3/04842; G06Q 10/101; G06Q 10/103; G06Q 10/109; G06Q 10/1095
See application file for complete search history.

(56) References Cited

U.S. PATENT DOCUMENTS 5,835,494 A  *  11/1998  Hughes ............... H04L 12/5602
                                                          370/397
6,011,858 A        1/2000  Stock et al.
(Continued)

OTHER PUBLICATIONS

PCT International Search Report and Written Opinion for International Application No. PCT/US2016/051852, dated Nov. 9, 2016, 11 pages.

(Continued)

*Primary Examiner* — Jung-Mu T Chuang
(74) *Attorney, Agent, or Firm* — Lowenstein Sandler LLP

(57) ABSTRACT

A method is disclosed herein for sharing documents with individuals determined to be participants in an interaction or meeting. The method includes identifying a document of a first user of a first user device, the document being associated with an interaction, and determining a plurality of participants with whom the document is to be shared, wherein the determining of the plurality of participants with whom the document is to be shared comprises adding a set of scheduled attendees of a calendar event to the plurality of participants, detecting a second user device of a second user, the second user device located proximal to the first user device of the first user, and adding the second user to the plurality of participants. The method further includes providing access to the document to the plurality of participant, and providing a representation of each participant of the plurality of participants for presentation on the first user device.

20 Claims, 7 Drawing Sheets

(52) U.S. Cl.
CPC ......... *G06Q 10/103* (2013.01); *G06Q 10/109* (2013.01); *G06Q 10/1095* (2013.01)

(56) References Cited

U.S. PATENT DOCUMENTS

| | | | |
|---|---|---|---|
| 6,674,718 B1* | 1/2004 | Heddes | H04L 47/10 370/230 |
| 6,721,325 B1* | 4/2004 | Duckering | H04L 12/5602 370/230.1 |
| 7,123,622 B2* | 10/2006 | Bass | H04L 47/20 370/413 |
| 7,373,173 B2 | 5/2008 | Brittan et al. | |
| 7,774,221 B2 | 8/2010 | Miller et al. | |
| 7,796,309 B2 | 9/2010 | Sadovsky et al. | |
| 7,962,525 B2 | 6/2011 | Kansal | |
| 8,060,018 B2 | 11/2011 | Davis et al. | |
| 8,266,534 B2 | 9/2012 | Curtis et al. | |
| 8,433,751 B2 | 4/2013 | Burns et al. | |
| 8,701,018 B1* | 4/2014 | Keel | G06Q 10/10 715/751 |
| 8,892,123 B2 | 11/2014 | Krantz et al. | |
| 9,483,452 B2 | 11/2016 | Blanchard et al. | |
| 9,519,886 B2 | 12/2016 | Berger et al. | |
| 9,569,754 B2 | 2/2017 | Lyle et al. | |
| 9,774,658 B2* | 9/2017 | Borzycki | H04L 67/10 |
| 9,965,541 B2* | 5/2018 | Gadamsetty | G06F 16/285 |
| 2001/0049617 A1 | 12/2001 | Berenson et al. | |
| 2004/0168133 A1 | 8/2004 | Wynn et al. | |
| 2004/0257196 A1 | 12/2004 | Kotzin | |
| 2004/0268270 A1 | 12/2004 | Hill et al. | |
| 2005/0091316 A1 | 4/2005 | Ponce et al. | |
| 2005/0120052 A1 | 6/2005 | Miller et al. | |
| 2005/0138576 A1 | 6/2005 | Baumert et al. | |
| 2005/0273372 A1 | 12/2005 | Bowne et al. | |
| 2006/0009987 A1 | 1/2006 | Wang | |
| 2006/0149609 A1* | 7/2006 | Stenerson | G06Q 10/06 705/7.24 |
| 2006/0203758 A1 | 9/2006 | Tee et al. | |
| 2006/0235716 A1* | 10/2006 | Mahesh | G06F 19/321 709/204 |
| 2006/0236247 A1* | 10/2006 | Morita | G06F 19/321 715/733 |
| 2006/0251339 A1 | 11/2006 | Gokturk et al. | |
| 2007/0011231 A1* | 1/2007 | Manion | H04L 12/1827 709/204 |
| 2007/0016733 A1 | 1/2007 | Day et al. | |
| 2007/0060334 A1 | 3/2007 | Rowe | |
| 2007/0070940 A1 | 3/2007 | Vander Veen et al. | |
| 2007/0253603 A1 | 11/2007 | Kimura et al. | |
| 2007/0255785 A1 | 11/2007 | Hayashi et al. | |
| 2007/0260989 A1 | 11/2007 | Vakil et al. | |
| 2007/0276908 A1 | 11/2007 | Asthana et al. | |
| 2008/0033957 A1 | 2/2008 | Forstall et al. | |
| 2008/0040187 A1 | 2/2008 | Carraher et al. | |
| 2008/0085682 A1 | 4/2008 | Rao | |
| 2008/0141142 A1 | 6/2008 | Lyle et al. | |
| 2008/0154903 A1 | 6/2008 | Crowley et al. | |
| 2008/0235681 A1 | 9/2008 | Barnett | |
| 2008/0300937 A1 | 12/2008 | Allen et al. | |
| 2009/0099921 A1* | 4/2009 | Klein | G06Q 30/02 705/14.69 |
| 2009/0167493 A1 | 7/2009 | Colciago | |
| 2009/0201896 A1* | 8/2009 | Davis | H04W 84/18 370/338 |
| 2009/0249224 A1 | 10/2009 | Davis et al. | |
| 2009/0252383 A1 | 10/2009 | Adam et al. | |
| 2009/0254978 A1 | 10/2009 | Rouskov et al. | |
| 2009/0255153 A1 | 10/2009 | Mori et al. | |
| 2010/0002122 A1 | 1/2010 | Larson et al. | |
| 2010/0037177 A1* | 2/2010 | Golsorkhi | G06Q 30/0603 715/818 |
| 2010/0095349 A1 | 4/2010 | Motoyama | |
| 2010/0141393 A1 | 6/2010 | Daniel | |
| 2010/0175001 A1 | 7/2010 | Lazarus et al. | |
| 2010/0216429 A1 | 8/2010 | Mahajan | |
| 2010/0235446 A1 | 9/2010 | Hehmeyer et al. | |
| 2010/0318399 A1 | 12/2010 | Li et al. | |
| 2011/0047237 A1 | 2/2011 | Walsh et al. | |
| 2011/0131419 A1 | 6/2011 | Dowds et al. | |
| 2011/0153744 A1 | 6/2011 | Brown | |
| 2011/0205435 A1* | 8/2011 | Lee | H04N 5/44543 348/563 |
| 2011/0239287 A1 | 9/2011 | Pak et al. | |
| 2011/0241985 A1* | 10/2011 | Hill | G06F 3/017 345/157 |
| 2011/0279350 A1 | 11/2011 | Hutchinson et al. | |
| 2011/0319016 A1 | 12/2011 | Gormley et al. | |
| 2011/0320237 A1 | 12/2011 | Beaman et al. | |
| 2012/0068779 A1 | 3/2012 | Lee et al. | |
| 2012/0221963 A1 | 8/2012 | Motoyama | |
| 2013/0011925 A1 | 1/2013 | Gilar et al. | |
| 2013/0036369 A1 | 2/2013 | Mitchell et al. | |
| 2013/0067549 A1* | 3/2013 | Caldwell | H04L 63/0815 726/7 |
| 2013/0110925 A1 | 5/2013 | Wessling et al. | |
| 2013/0179150 A1 | 7/2013 | Eriksson et al. | |
| 2013/0191719 A1 | 7/2013 | Underhill et al. | |
| 2013/0237240 A1* | 9/2013 | Krantz | H04M 3/56 455/456.1 |
| 2013/0262658 A1* | 10/2013 | Athale | H04L 67/22 709/224 |
| 2014/0074536 A1 | 3/2014 | Meushar et al. | |
| 2014/0091139 A1 | 4/2014 | Brown et al. | |
| 2014/0095990 A1 | 4/2014 | Blanchard et al. | |
| 2014/0108506 A1* | 4/2014 | Borzycki | H04L 67/10 709/203 |
| 2014/0330771 A1* | 11/2014 | Smith | G06Q 30/02 707/609 |
| 2014/0344739 A1* | 11/2014 | Yoon | G06F 16/176 715/769 |
| 2014/0358613 A1 | 12/2014 | Libin | |
| 2015/0046370 A1 | 2/2015 | Libin et al. | |
| 2015/0058748 A1* | 2/2015 | Huang | H04L 65/403 715/753 |
| 2015/0082195 A1 | 3/2015 | Berger et al. | |
| 2015/0082196 A1 | 3/2015 | Berger et al. | |
| 2015/0120577 A1* | 4/2015 | Lobo | G06Q 10/103 705/301 |
| 2015/0215775 A1 | 7/2015 | Burch et al. | |
| 2015/0347586 A1 | 12/2015 | Fasen et al. | |
| 2016/0205081 A1* | 7/2016 | Simons | H04L 41/22 715/743 |
| 2016/0246869 A1* | 8/2016 | Gadamsetty | G06F 16/285 |
| 2016/0259761 A1 | 9/2016 | Laborczfalvi | |
| 2016/0335414 A1* | 11/2016 | Isaacs | G06F 19/3456 |
| 2017/0075919 A1* | 3/2017 | Bose | G06F 21/00 |
| 2017/0083871 A1 | 3/2017 | Chang et al. | |
| 2017/0093780 A1* | 3/2017 | Lieb | G06F 16/50 |

OTHER PUBLICATIONS

Color Photo-Sharing App Takes Social Networking to an Amazing, Terrifying New Place [online]. Retrieved from the Internet: <http://www.digitaltrends.com/social-media/color-photo-sharing-app-takes-socialnetworking>, Mar. 24, 2011, 6 pages.

Kozhenkov, NFC Alternative: Transferring Data Between Mobile Devices Using Ultrasound, Oct. 9, 2013, printed from the internet Mar. 5, 2015 at http://rnd.azoft.com/mobile-apptranseringdatausing-ultrasound, 6 pages.

* cited by examiner

SYSTEM AND METHOD FOR AUTOMATIC MEETING NOTE CREATION AND SHARING USING A USER'S CONTEXT AND PHYSICAL PROXIMITY

CROSS-REFERENCE TO RELATED APPLICATIONS

This application is a continuation application of co-pending U.S. patent application Ser. No. 14/871,004, filed on Sep. 30, 2015, entitled, "System and Method for Automatic Meeting Note Creation and Sharing Using a User's Context and Physical Proximity," which is herein incorporated by reference.

FIELD OF THE INVENTION

In general, this disclosure relates to generating and sharing a document with a set of users determined to be involved in an interaction.

BACKGROUND

Meetings occur frequently in workplace environments and on an ad hoc basis. For these meetings, meeting notes function to keep a meeting on track and serve as a reminder of decisions made and action-items generated. However, many meetings happen without having notes taken due to the hassle of meeting note creation and recording or forgetfulness. Sometimes several different copies of meeting notes are generated by separate attendees or a designated note taker may miss an important point in the notes during the meeting.

Additionally, meetings frequently occur that include a combination of in-person and remote participants. These meetings may be scheduled, such as with a calendar event, or they may occur ad hoc. Participants may include invited individuals as well as additional individuals without a formal calendar invitation. In many of these cases, collaborative meeting notes may be the best means for generating detailed and helpful meeting notes, if the participants in the interaction can be identified and an appropriate document generated and shared with the participants.

SUMMARY

Accordingly, systems and methods are described herein for generation of a meeting note document and sharing of the document with the individuals determined to be participants in the interaction or meeting. A processor of a first user device of a first user receives a selection of the first user to create a document for an interaction. The processor of the first user device searches for data associated with the interaction. Based on the data associated with the interaction, the processor determines the participants of the interaction. The processor of the first user device detects a second user device of a second user which is located proximal to the first user device and is capable of communicating with the first user device. The processor of the first user device determines that the first user and the second user are participating in the interaction. The processor creates the document for the interaction and includes in the document information from the data associated with the interaction. The processor assigns an access control list for the document which includes the first user, the second user and the participants in the interaction determined by proximity and from the data associated with the interaction. The processor then shares the document according to the access control list.

In some aspects, the respective user devices of each of the participants in the interaction are prompted to download the document from a server and the document is displayed on the respective user devices. In some aspects, the access control list includes access privilege options for each of the respective participants in the interaction.

In some aspects, determining participants in the interaction includes identifying a calendar appointment for the interaction and attendees associated with the calendar appointment. In some aspects, determining that the first user and the second user are part of the interaction includes comparing first calendar data of the first user and second calendar data of the second user to select a matching calendar event. In some aspects, determining that the first user and the second user are part of the interaction includes comparing first calendar data of the first user and second calendar data of the second user and determining that there is not a matching calendar event. In some aspects, selecting the matching calendar event includes selecting the calendar event from a plurality of calendar events based on a percentage of users of the selected calendar even that are proximal to the first user.

In some aspects, sharing the document includes creating a link to the document and attaching it to the calendar event associated with the interaction. In some aspects, data associated with the interaction can include a meeting title, a meeting time, a time of document creation, a meeting location and a list of participants.

In some aspects, determining other users also participating in the interaction includes detecting other devices proximal to the first user belonging to users who are not included in data associated with the interaction such as a calendar event. In some aspects, determining other users also participating in the interaction includes displaying on the first user device a representation of each user identified as participating in the interaction, detecting on the first device a selection of a subset of the identified users, and sending a message to each device associated with a user in the selected subset of users.

BRIEF DESCRIPTION OF THE DRAWINGS

The above and other features of the present disclosure, including its nature and its various advantages, will be more apparent upon consideration of the following detailed description, taken in conjunction with the accompany drawings in which.

DETAILED DESCRIPTION

Figure 1:
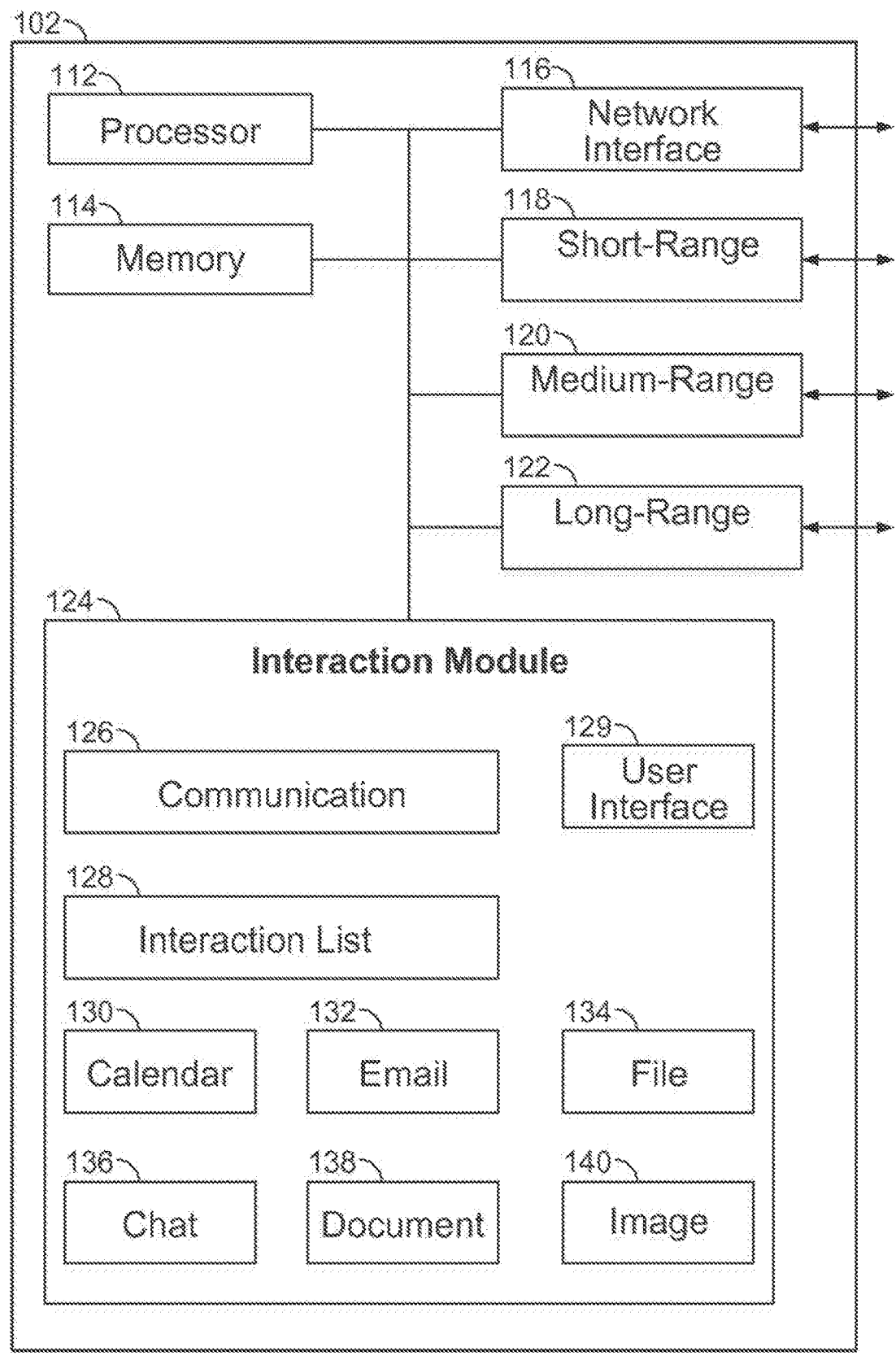
FIG. 1 depicts a user device for determining users involved in an interaction, according to an illustrative implementation.

To provide an overall understanding of the disclosure, certain illustrative implementations will now be described, including a system for creating and sharing a document with users determined to be to involved in an interaction. The system combines calendar information with physical proximity information to determine the interaction taking place and the participants in the interaction. In response to a selection by a user involved in the interaction to create meeting notes, a document is generated and assigned a title and other details based on interaction details. The document is then shared with users participating in the interaction directly to their user devices or as a link to the document sent via an email, calendar information or other message related to the interaction. The document functions as a collaborative meeting notes document which allows users participating in the interaction with whom the document is shared to collaboratively edit the document to take meeting notes.

The users involved in the interaction can include both users that are physically proximate and users that are remote but participating in the interaction via telephone conference, video conference, or other form of remote communication. In particular, the system combines calendar information with physical proximity information to determine the users involved in the interaction. Combining calendar information with physical proximity information is useful because meetings can involve both scheduled participants and ad hoc participants. Ad hoc participants are individuals who were not scheduled participants of a meeting but participated in the meeting regardless. The calendar information provides information about the scheduled participants of a meeting. The physical proximity provides information about users that are physically proximate, such as in the same room or building, but who may or may not be scheduled to participate in the interaction. In some examples, physically proximate users may be ad hoc participants. By combining both scheduled and ad hoc participants, a complete list of all users involved in the interaction can be determined.

The systems and methods described herein use device-to-device communication to determine physical proximity information. Device-to-device communication can include high frequency audio, Bluetooth, Bluetooth LE, and WiFi communication. The device-to-device communication can include transmission of identifying information by a device. The identifying information can include user names, user ids, user email addresses, and links to profile pictures. Other user devices that are physically proximate to the transmitting user devices can receive these transmissions and use the received device-to-device transmissions to determine physically proximate users. For a device receiving such a device-to-device transmission, a physically proximate user can be defined as a user whose identifying information is contained in a received transmission. A user device may only transmit and/or receive device-to-device communication when a user of the device enables device-to-device communication and configures the device-to-device communication to be used in the manner described herein.

After building a list of physically proximate users, the system can present the list to a user on their user device to enable the user to select an action to take, in this case generating a meeting notes document and to select participants with whom to share the document. The user can select participants from the list and choose to share the document with the participants. The system can determine, based on the physically proximate users, a current meeting for the first user and combine the proximate users with participants of the current meeting to build a complete interaction list. The first user can then generate and share the meeting document with the participants on the interaction list at the touch of a button.

FIG. 1 depicts a user device 102. The user device 102 can be used for determining users involved in an interaction, receiving a collaborative notes document for the interaction, and other suitable functions. The user device 102 includes a processor 112, a memory 114, a network interface 116, a short-range communication interface 118, a medium-range communication interface 120, a long-range communication interface 122, and an interaction module 124. The memory 114 stores instructions which, when executed by the processor 112, run applications such as the interaction module 124. The network interface is used to connect to a network such as the Internet or an intranet. The short-range communication interface 118 can include hardware and software configured to transmit and receive information via short-range communication such as high frequency audio. The short-range communication interface 118 can include an audio transmitter such as a speaker and an audio receiver such as a microphone. The medium-range communication interface 120 includes hardware and software configured to transmit and receive information via medium-range communication such as Bluetooth, Bluetooth LE, and WiFi. The medium-range communication interface 120 can include a radio-frequency antenna for transmitting and receiving information via radio-frequency signals. The long-range communication interface 122 includes hardware and software configured to transmit and receive information via long-range communication such as cellular or other radio-frequency communication. The long-range communication interface 122 can include a radio frequency antenna configured to operate at higher power levels than the antenna of the medium-range communication interface 120. Thus, the long-range communication interface 122 can communicate via cellular networks. Each of the short-range communication interface 118, the medium-range communication interface 120, and the long-range communication interface 122 can include circuitry configured to convert between analog signals that are transmitted to other devices and received from other devices and digital signals for processing by the processor 112, the memory 114, and the interaction module 124. This conversion circuitry can include analog-to-digital converters and digital-to-analog converters.

The interaction module 124 includes a communication submodule 126, an interaction list submodule 128, a user interface submodule 129, a calendar submodule 130, an email submodule 132, a file submodule 134, a chat submodule 136, a document submodule 138, and an image submodule 140. The communication submodule 126 receives and processes information from one or more of the short-range communication interface 118, the medium-range communication interface 120, and the long-range communication interface 122. The communication submodule 126 communicates with the network interface 116. Based on the information processed by the communication submodule 126, the interaction list submodule 128 determines a list of users involved in an interaction. The user interface submodule 129 presents the interaction list to the user via a display of the user device 102. The user provides to the user interface submodule 129 a selection of participants from the interaction list. The user also provides to the user interface submodule 129 a selection of a follow-up action. If the selected follow-up action is to create a new calendar event, the calendar submodule 130 creates a new calendar event with the selected participants and then sends the event to the selected participants. If the selected follow-up action is to send an email, the email submodule 132 provides an interface for sending an email to the selected participants. If the selected follow-up action is to share a file, the file submodule 134 provides an interface to select and share a file with the selected participants. If the selected follow-up action is to start a chat session, the chat submodule 136 provides an interface to start a chat session with the selected participants. If the selected follow-up action is to create a new document, the document submodule 138 provides an interface for creating a collaborative document accessible by the selected participants. If the selected follow-up action is to share an image, the image submodule 140 provides a user interface for selecting and sharing one or more images with the selected participants. By building an interaction list, the interaction module 124 allows the user to quickly share a meeting notes document with selected participants in the interaction.

Figure 2:
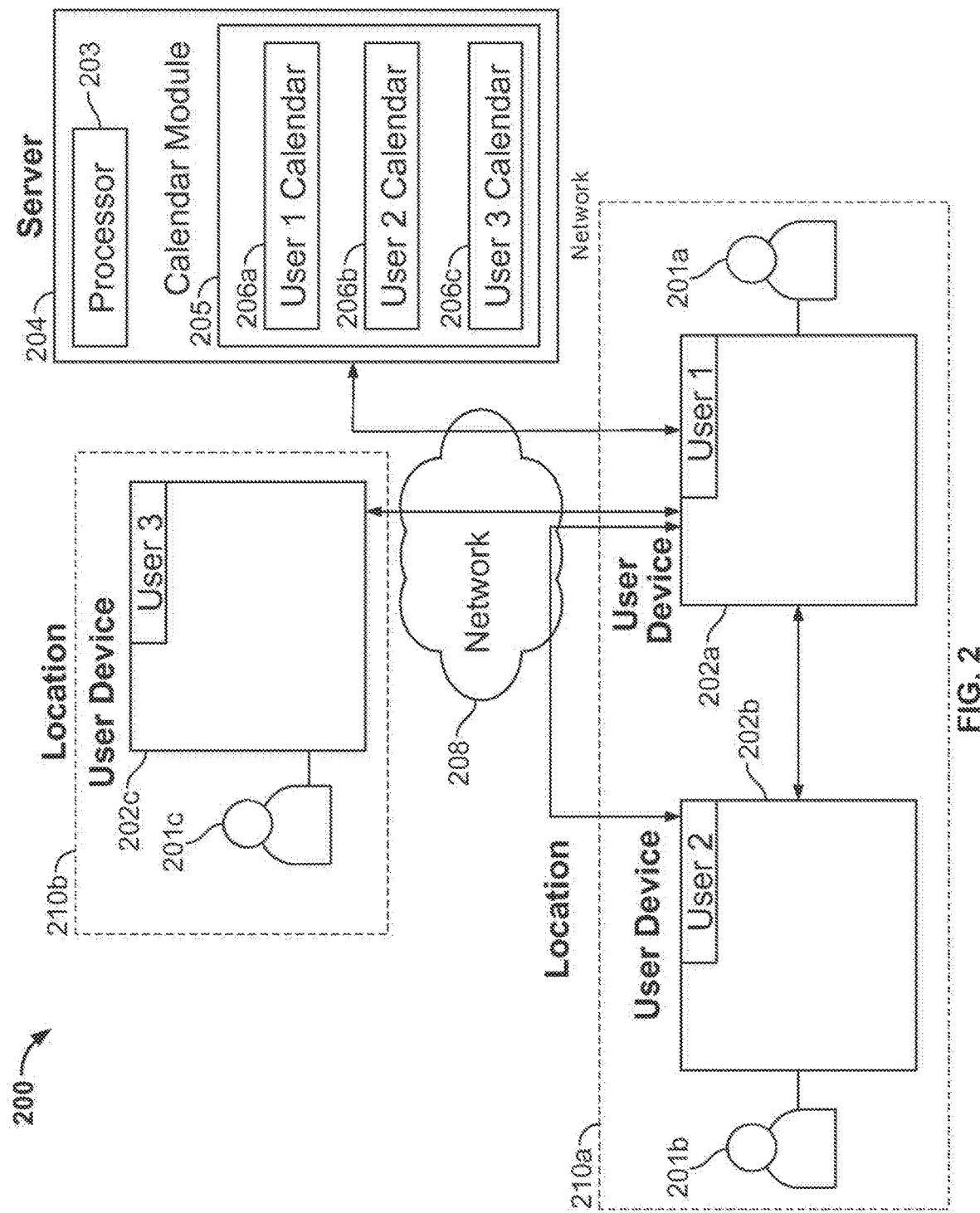
FIG. 2 depicts a client-server system for determining users involved in an interaction, according to an illustrative implementation.

FIG. 2 depicts a client-server system 200 for determining users involved in an interaction. The system 200 includes user devices 202*a*, 202*b*, and 202*c*, (collectively, user devices 202), used by users 201*a*, 201*b*, and 201*c*, respectively (collectively, users 201). Each of the user devices 202 can be a user device 102 and include some or all of the components of the user device 102. The system 200 also includes a server 204 and a network 208. While only some of the communications paths via the network 208 are shown for clarity of illustration, each of the user devices 202 and the server 204 can communicate with each other via the network 208. The network 208 can be a network such as the Internet or an intranet, or another communications network. The server 204 includes a processor 203 and a calendar module 205 for storing, modifying, and sharing calendar information 206*a*, 206*b*, and 206*c* (collectively, calendar information 206). The server may also include a document module for temporarily storing, accessing, modifying and sharing documents.

The user devices 202*a* and 202*b* are in a location 210*a*. The user device 202*c* is in another location 210*b*. Collectively, the locations 210*a* and 210*b* are referred to herein as locations 210. Each of the locations 210 can be a physically defined space such as a room, a lecture hall, a hallway, a floor of the building, or a building.

Each of these locations 210 can also be defined on the basis of proximity rather than structure. Accordingly, each of the locations 210 can be a general area of an otherwise undefined location in which the devices are close enough to communicate via device-to-device communication. For example, location 210*a* and 210*b* are part of a large open space, and location 210*b* can be another part of the same large open space, but sufficiently far from the location 210*a* such that the user device 202*c* cannot communicate with the user devices 202*a* and 202*b* via device-to-device communication. Thus, the definition of location can depend on the mode and range of the device-to-device communication in use. For example, these devices may be considered to be in separate locations if high-frequency audio is the mode of device-to-device communication in use, but in the same location if Bluetooth is the mode of device-to-device communication in use, since Bluetooth can have a longer range and better obstacle penetration than high-frequency audio.

In the system 200, the user devices 202*a* and 202*b* are communicating with each other via device-to-device communication. The device-to-device communication between user devices 202*a* and 202*b* can be implemented on each of the user devices by one or more of the short-range communication interface 118, the medium-range communication interface 120, and the long-range communication interface 122. Since the user device 202*c* is in a different location, the user devices 202*a* and 202*b* cannot use device-to-device communication to communicate with the user device 202*c*. Users that do not wish to participate in device-to-device communication can set the user devices 202*a* and 202*b* to a private mode so that the devices are not detected. In another implementation, users must affirmatively select a user device mode to participate in device-to-device communication with proximate user devices.

After communicating with user device 202*b* via device-to-device communication, the user device 202*a* communicates with the server 204 to retrieve the calendar information 206*a*. Based on the calendar information 206*a*, the interaction list submodule 128 determines a current meeting for the user 201*a*. If the calendar information 206*a* includes only one meeting for the user 201*a* at the current time, then the one meeting is the current meeting for user 201*a*. However, in general, calendar information 206 can include more than one meeting for a user at a particular time period. Thus, the interaction list submodule 128 must determine which of the conflicting meetings is the current meeting for the user 201*a*. The situation of conflicting meetings can occur when a user 201*a* receives multiple meeting invitations for the same time and does not remove one or more of the conflicting meetings from a calendar of the user 201*a*. To determine which of the conflicting meetings is the current meeting for the user 201*a*, the interaction list submodule 128 uses physical proximity information to determine the current meeting. Using the physical proximity information can include determining a meeting with maximum overlap between proximate users and scheduled users.

In an illustrative example, the calendar information 206*a* includes a first meeting whose scheduled participants are the user 201*a*, the user 201*b*, and the user 201*c*. The calendar information 206*a* can also include a second meeting at the current time whose participants are the user 201*a*, the user 201*b*, and 99 other users not in the location 210*a*. In this example, the interaction list submodule 128 of the user device 202*a* determines that the user is proximate to 50% of the other scheduled users of the first meeting and 1% of the other scheduled users of the second meeting. Since the user 201*a* is proximate to a higher percentage of users in the first meeting, the interaction list submodule 128 determines that the current meeting for the user 201*a* is the first meeting. In some examples, additional users not scheduled for the current meeting are also proximate to the user 201*a* in the location 210*a*. In these examples, these additional users would be added to a list for the current interaction and would be used by the interaction list submodule 128 to determine the current meeting. In this example, the current meeting is determined for user 201 a by the calendar module 205 and in the case of any overlap in meetings, the correct current meeting is determined by proximity to participants in the meeting (such as user 201 *b*). After determining the current meeting for the user 201*a*, the user device 202*a* transmits a message to the user devices 202*b* and 202*c* belonging to users 201*b* and 201*c*, the scheduled participants of the current meeting. This message includes a link to a document to be collaboratively edited and a command to the user devices 202*b* and 202*c* to open the document. The message can also include a notification that a document has been shared and an invitation to open the document to collaboratively edit. The document may be sent via the network 208.

In some examples, additional users are present within the location 210a but not part of the current meeting for the user 201a. In these examples, these additional users are proximate users and are added to the interaction list along with scheduled users for the current meeting. In some examples, the user 201a selects a subset from the interaction list for the follow-up action. In these examples, only the selected subset of users will receive the second message regarding the follow-up action.

Figure 3:
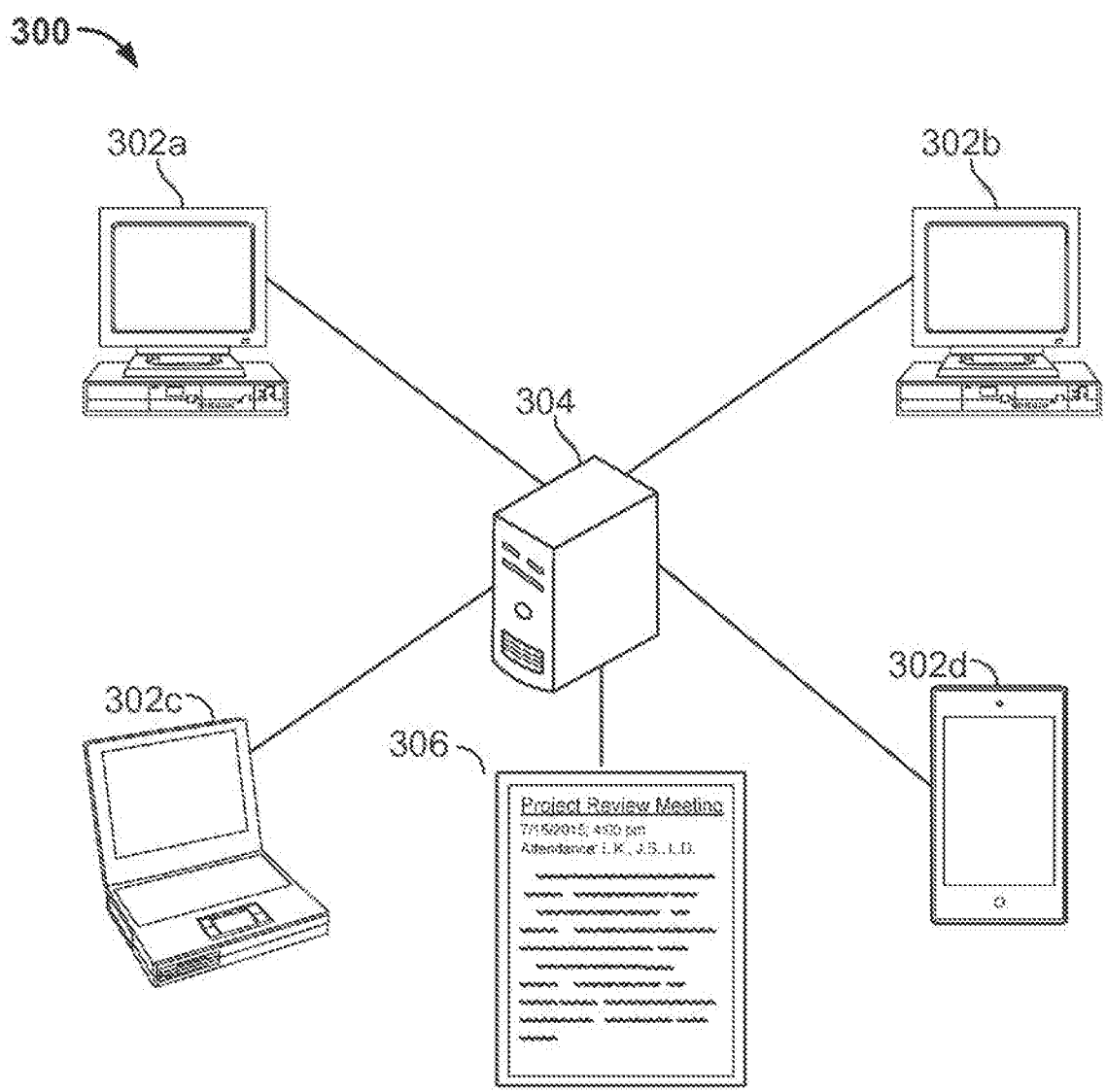
FIG. 3 depicts a client-server system for generating and sharing a document with selected users, according to an illustrative implementation.

FIG. 3 depicts a client-server system 300 that includes a cloud computing service 304 and a number of client devices 302a-302d (generally, client devices 302). Any of the client devices 302 can be the same as, or contain the same components as, the user device 102 and any of the user devices 202. The cloud computing service 304 can be the same as, or contain the same components as, the server 204. The cloud computing service 304 provides cloud computing services for a set of client devices 302. In particular, the cloud computing service 304 may include one or more servers that store a number of files accessible by the client devices 302a-302d, such as an exemplary collaborative meeting notes document 306. The document 306 may be created by the document submodule 138 and generated based on the meeting details found in calendar information for sharing with other participants in an interaction. Users at the client devices 302 may create, edit, copy, share, and delete files stored on the cloud computing service 304. The files stored on the cloud computing service 304 may have associated access control lists which define access roles of a user with regard to a particular file. For example, a user may have editing privileges for one document, but may only be granted viewing access for another.

The generated document may be simultaneously distributed or shared amongst participants in the meeting. The document may be downloaded to the respective user device of each participant and opened simultaneously. In some implementations, the respective user devices each receive a message to access a file in a cloud-storage system. In other implementations the respective user devices each receive a message to download a file from a cloud-storage system. In some implementations, user devices proximal to the first user device may receive a message from the first user device prompting the user devices to open the generated meeting notes document simultaneously. In some implementations, a message may be sent to each user device to invite the participant to open the document or link to the document in a web browser. The message may be sent to the respective user devices from a first user device via a server, WiFi, Bluetooth, Bluetooth LE, 3G, or any other suitable mechanism for communicating a message.

The document generated and shared with participants in the meeting may be a collaborative document which all users can edit simultaneously during the interaction. For example, the client devices 302 may each use a web browser to simultaneously access the document 306 on the cloud computing service 304. The cloud computing service 304 provides each client device 302 with a local copy of the document 306, which users on the client devices 302 may then view and edit. The cloud computing service 304 may synchronize the local copies of the document 306 with one another and with a copy of the document 306 that is stored on a server in the cloud computing service 304. In one example, edits, which may be referred to herein as changes, that are made by the client device 302a are automatically sent to the cloud computing service 304 and transmitted to the other client devices 302b, 302c, and 302d. In this manner, changes made by one collaborator may be immediately seen by other collaborators.

As used herein, a file includes a set of digitally encoded bits stored on a storage medium. A cloud file includes a file that is stored on a server and accessible via a network. A local file includes a file stored on a user's local device. A client device includes a local device that communicates with a server in a client-server relationship. As used herein, a client device is synonymous with a user device and a local device, unless indicated otherwise by context. As used herein, a document can be associated with multiple files. For example, a cloud file may be a copy of a document stored on a server, and a local file may be a copy of the same document stored on a local device. Generally, multiple copies of the same document may be identical, but they may differ if changes made by one collaborator have not yet been transmitted to other collaborators. This situation may occur when the network connection is slow or intermittent. Multiple copies of the same document may also differ slightly if the copies are stored on disparate types of devices, such as devices with different operating systems. In this case, different copies may have slightly different metadata, or may be encoded differently. For example, one copy may be encoded in a format in which the first bit in a byte contains the most significant bit, and another copy may be encoded in a format in which the first bit in a byte contains the least significant bit. These format differences can exist across multiple files that are copies of the same document, as long as the substance of the information that is displayed to the user is the same across the copies. A local device may read the contents of a file (stored in nonvolatile memory) and store a model representing the file in working memory. The working memory may be volatile (e.g. RAM or an equivalent).

The client devices 302 may include any combination of desktop computers, laptop computers, tablets, smart phones, mobile electronic devices, or any other device that may connect to the cloud computing service 304 through a network. Only four client devices 302 are shown in system 300, but it should be understood that any number of client devices 302 of any type may be configured to communicate with the cloud computing service 304. The cloud computing service 304 and the client devices 302 of the system 300 may be connected through a remote network, such as the Internet. The network connection may be facilitated through a local area network, wide area network, Ethernet, fiber optic network, wireless network, cellular network, interactive television network, telephone network, wireless data transmission system, two-way cable system, customized private or public computer network, interactive kiosk network, direct link, satellite network, and or any other wired or wireless connection.

Figure 4:
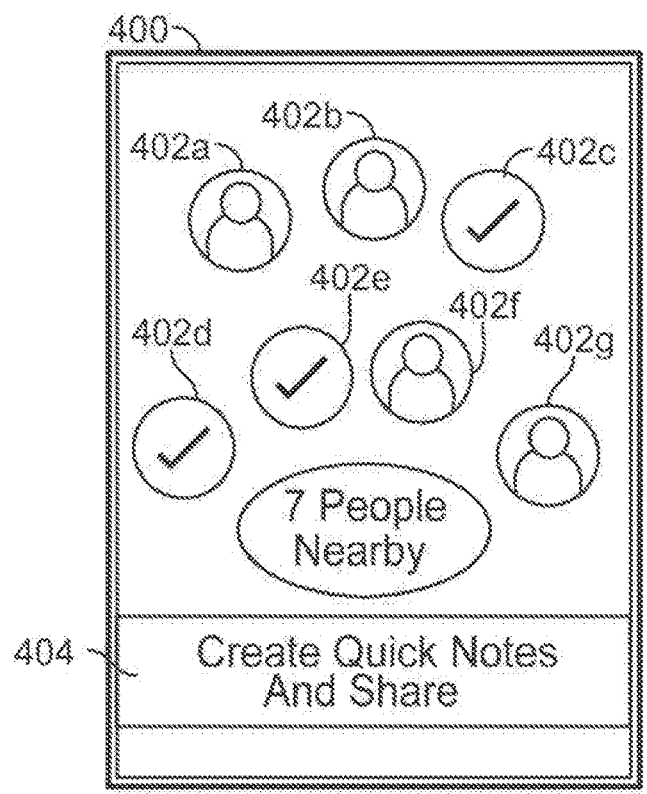
FIG. 4 depicts graphical user interfaces for creating and sharing a document with selected users, according to an illustrative implementation.
Figure 4:
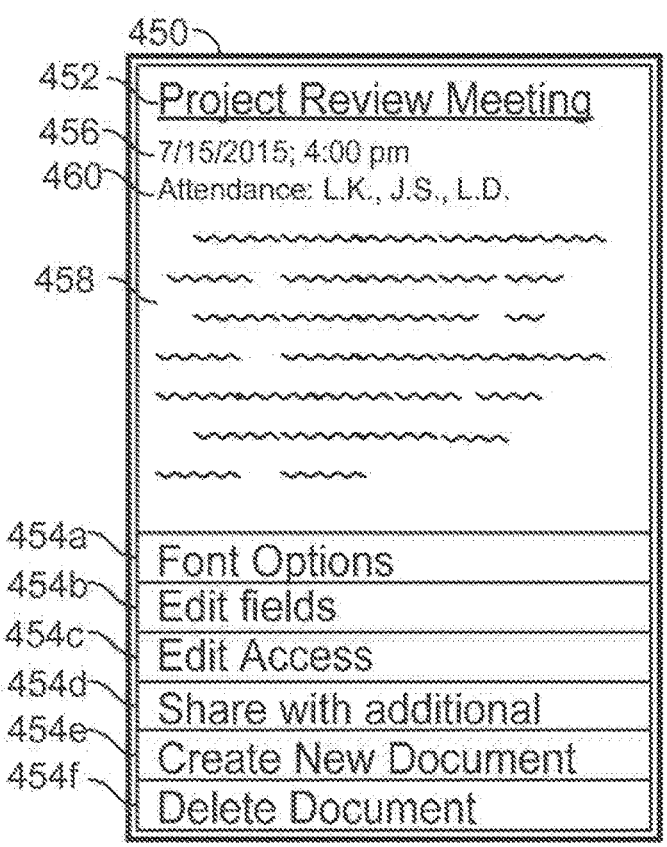

FIG. 4 depicts graphical user interfaces 400 for creating and sharing a document. The graphical user interface 400 includes icons 402a, 402b, 402c, 402d, 402e, 402f, and 402g (collectively, icons 402). Each of the icons 402 represents a user in a current interaction. The users represented by the icons 402 can be proximate users or scheduled users. At the user interface 400, a user can select one or more of the icons 402 to indicate the inclusion of users represented by the selected icons in a list of participants with whom to share a meeting notes document. In the user interface 400, the icons 402c, 402d, and 402e have been selected by a user to indicate the inclusion of users as participants in the interaction with whom the user can choose to share meeting notes. The user interface 400 includes a menu item 404 which allows the user to generate a meeting note document for the interaction and share it with the participants selected from the possible participants in the user interface 400. In some implementations, the user selecting the participants and creating the document for sharing may not be the meeting organizer or the individual that created the meeting calendar event.

Sharing the document with the selected participants may open the document in a separate application located on the device or in a web-browser. In these examples, the options available to a user are those of the application in which the document is opened. These options may include such common options as modifying text style, adding a comment, making changes to the text and saving the document. In some examples, the document may be opened in the user interface 450. The user interface 450 includes a view of the meeting notes collaborative document 458, with meeting details 452, 456 and 460. The user interface 450 also includes menu items 454a, 454b, 454c, 454d, 454e, and 454f (collectively, menu items 454). The user can select one of the menu items 454 to select an action to interact with the document. The meeting details 452, 456 and 460 may be generated automatically from the details of the interaction contained in calendar information (for example, the notes title 456 and time and date 452) and from the list of participants selected by the user in the user interface 400 in order to generate a list of meeting attendees 460. In some implementations, only a portion of the meeting details may be available in the calendar information and the user may be prompted to supply the details or may select an option 454b allowing the user to edit the meeting detail fields including 452, 456, and 460. In another example, no specific interaction details may available, in which case the document generator may suggest time, date and place using information from the user device, as placeholder information for the meeting notes. In some implementations, selecting to share the meeting notes with a participant not included in the calendar event may send the participant an invitation to the calendar event. In other implementations, selecting to share the meeting notes with a participant not included in the calendar even may prompt the first user to confirm sharing the meeting notes with the participant or prompt the first user to choose whether to send the participant an invitation to the calendar event.

Various menu items may be available to the user via the user interface which allow the user to interact with the document in various ways, and which may be appropriate for the user device being served the document. Options related to the style of the text may be available 454a. In some examples, the menu items 454 on the graphical user interface 450 may open new menus with additional choices when selected. The menu items can also contain options related to the access control of the generated document 454c and options to share the document with additional participants 454d. Additional menu items may allow the user to create a new document 454e or delete the current document 454f Some menu items, such as delete the current document 454f may be available only to the first user or to specific users based on the access control of the generated document.

The access control of the generated and shared document may be available only to the first user or to the first user and any other users given control of the access control list by the first user. The access control allows users to interact with the document in various ways. In some implementations, granting a participant access to the document may allow users in a domain to access a document when they would be otherwise unable to do so. A first user may grant access to a user not proximal to the first user and not included as a participant in order to allow the user to participate in the meeting remotely.

Figure 5:
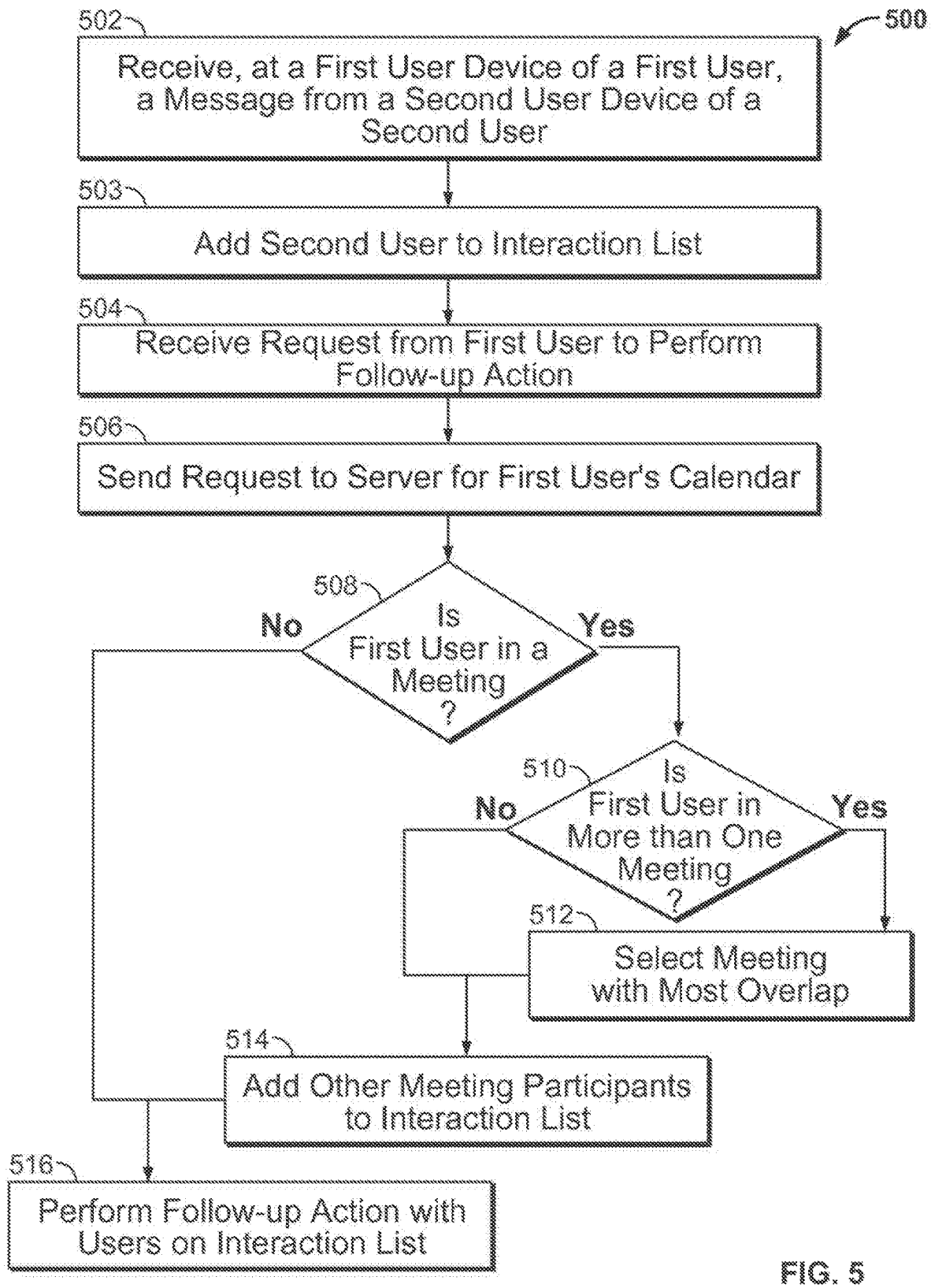
FIG. 5 is a flowchart of a method used to determine a list of users involved in an interaction, according to an illustrative implementation.

FIG. 5 is a flowchart of a method 500 used to determine a list of users involved in an interaction. At 502, a message is received at a first user device of a first user. The message is a message from a second user device of a second user. The message can be transmitted using device-to-device communication as described herein and received by one or more of the short-range communication interface 118, the medium-range communication interface 120, and the long-range communication interface 122. The message can include identification information of the second user.

At step 503, the interaction list submodule 128 adds the second user to the interaction list. The interaction list at this point contains proximate users.

At 504, a request is received from the first user to perform a follow-up action. Receiving the request can include receiving selections via the graphical user interface 400 and 450 of one or more of the icons 402 and/or receiving a selection of a menu item 454.

At 506, the first user device sends a request to the server for the first user's calendar. The first user's calendar can include calendar information 206a.

At decision block 508, the interaction list submodule 128 determines if the first user is currently in a meeting. The interaction list submodule 128 can make this determination based on whether the calendar information 206a includes a meeting at the current time. If the first user is in a meeting, the method 500 proceeds to the decision block 510.

At decision block 510, the interaction list submodule 128 determines if the first user is in more than one meeting at the current time. The interaction list submodule 128 can make this determination by determining whether the calendar information 206a includes multiple meetings for the current time. If the first user is in multiple meetings at the current time, the method 400 proceeds to the step 512.

At step 512, the interaction list submodule 128 selects the meeting with the most overlap. Selecting the meeting with the most overlap can include determining, for each meeting, the percentage of users proximate to the first user. Users can be determined to be proximate to the first user if device-to-device communication has been received by the first user device with identifying information for these users. Selecting the meeting with the most overlap can include selecting the meeting having the highest percentage of users proximate to the first user.

At step 514, the interaction list submodule 128 adds other meeting participants to the interaction list. Adding other meeting participants can include adding scheduled meeting participants to a list of proximate users.

At step 516, the interaction module 124 shares a collaborative meeting notes document with users on the interaction list. The interaction list can include all users or a selected subset of users.

Figure 6:
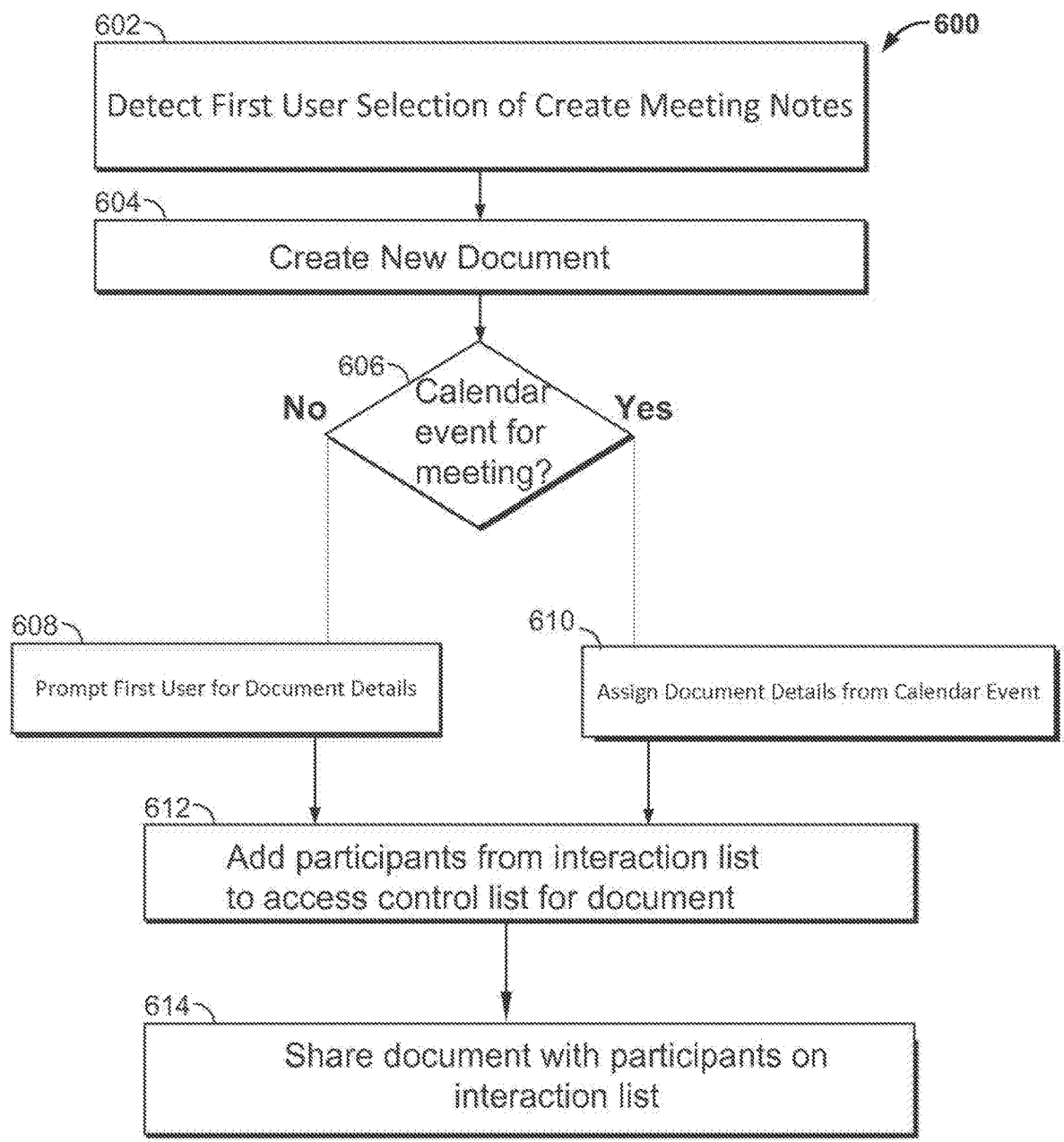
FIG. 6 is a flowchart of a method used to create and share meeting notes, according to an illustrative implementation.

FIG. 6 is a flowchart of a method 600 used to generate a meeting notes document and share the document with the participants on the interaction list. At 602 a selection by a first user to create meeting notes is detected. The selection of create meeting notes can be made from the user interface 400 by selecting menu item 404, or may be selected within a calendar application, a document editing application, or any other suitable application interface.

At step 604, a new document is created in response to the selection. The document may be created on an external or cloud-based server and may be generated in a directory belonging to the first user, such that the first user is the first author of the document and has access rights to the document.

At decision block 606, the processor determines if there is a calendar event having calendar information associated with the current interaction. The participants may be determined based on calendar information and proximity. The processor 203 may refer to the calendar module 205 to determine if there is an existing calendar event in the calendar of the first user 206*a* or if no calendar event exists for the interaction. If a calendar event exists for the interaction, the method 600 proceeds to step 610.

At step 610, the processor populates the header and details of meeting notes document with details from the calendar information related to the interaction. The processor may also prompt the user to supply details of the meeting if the details are not contained in the calendar event.

If there is no calendar event determined at decision block 606, the method proceeds to step 608 and the user is prompted to add details of the interaction to the document such as a title. In some implementations, placeholder information, for example, time, date and location, which may be obtained from the user device, may be added to the document.

At step 612, the participants on the interaction list in the interaction module 124 are added to the access control list for the document. This grants the participants privileges to view and edit the document. The first user may have owner or editor controls on the access control list to change the list of participants and/or limit access privileges of the participants.

At step 615, the document is shared with the participants in the interaction list. This may include adding a link to the document in the calendar event, sending an email or message with a link to the document to the user devices of the participants, or prompting the document to simultaneously open on the user devices of the participants.

Figure 7:
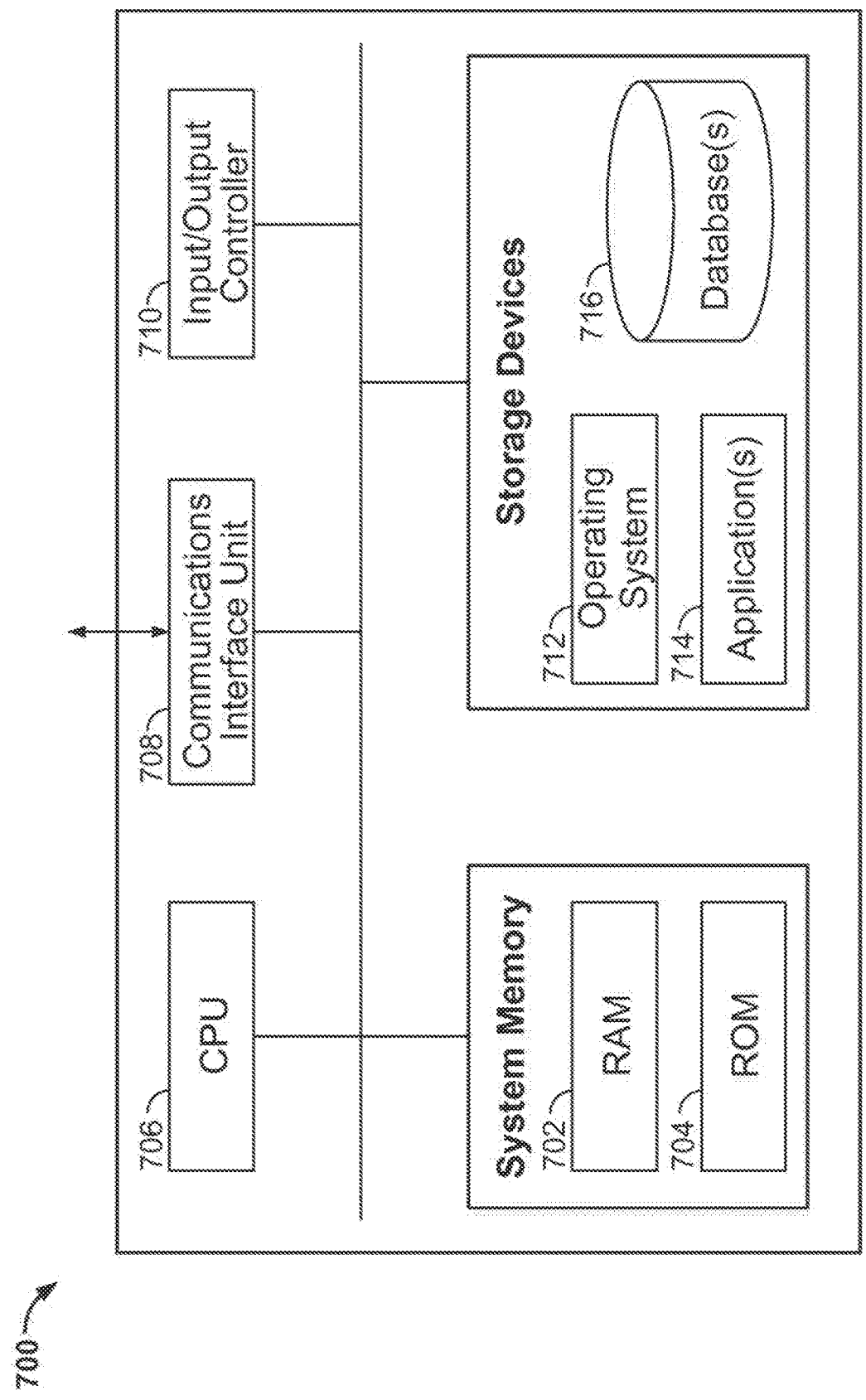
FIG. 7 is a block diagram of a computing device, such as any of the components of the systems of FIGS. 1-6, for performing any of the process described herein.

FIG. 7 is a block diagram of a computing device, such as any of the components of the systems of FIGS. 1-6, for performing any of the processes described herein. Each of the components of these systems may be implemented on one or more computing devices 700. In certain aspects, a plurality of the components of these systems may be included within one computing device 700. In certain implementations, a component and a storage device may be implemented across several computing devices 700.

The computing device 700 includes at least one communications interface unit, an input/output controller 710, system memory, and one or more data storage devices. The system memory includes at least one random access memory (RAM 702) and at least one read-only memory (ROM 704). All of these elements are in communication with a central processing unit (CPU 706) to facilitate the operation of the computing device 700. The computing device 700 may be configured in many different ways. For example, the computing device 700 may be a conventional standalone computer or alternatively, the functions of computing device 700 may be distributed across multiple computer systems and architectures. Alternatively, a computer system may be virtualized to provide the functions of multiple computing devices 700. In FIG. 7, the computing device 700 is linked, via network or local network, to other servers or systems.

The computing device 700 may be configured in a distributed architecture, wherein databases and processors are housed in separate units or locations. Some units perform primary processing functions and contain at a minimum a general controller or a processor and a system memory. In distributed architecture implementations, each of these units may be attached via the communications interface unit 708 to a communications hub or port (not shown) that serves as a primary communication link with other servers, client or user computers and other related devices. The communications hub or port may have minimal processing capability itself, serving primarily as a communications router. A variety of communications protocols may be part of the system, including, but not limited to: Ethernet, SAP, SAS™, ATP, BLUETOOTH™, GSM and TCP/IP.

The CPU 706 includes a processor, such as one or more conventional microprocessors and one or more supplementary co-processors such as math co-processors for offloading workload from the CPU 706. The CPU 706 is in communication with the communications interface unit 708 and the input/output controller 710, through which the CPU 706 communicates with other devices such as other servers, user terminals, or devices. The communications interface unit 708 and the input/output controller 710 may include multiple communication channels for simultaneous communication with, for example, other processors, servers or client terminals.

The CPU 706 is also in communication with the data storage device. The data storage device may include an appropriate combination of magnetic, optical or semiconductor memory, and may include, for example, RAM 702, ROM 704, flash drive, an optical disc such as a compact disc or a hard disk or drive. The CPU 706 and the data storage device each may be, for example, located entirely within a single computer or other computing device; or connected to each other by a communication medium, such as a USB port, serial port cable, a coaxial cable, an Ethernet cable, a telephone line, a radio frequency transceiver or other similar wireless or wired medium or combination of the foregoing. For example, the CPU 706 may be connected to the data storage device via the communications interface unit 708. The CPU 706 may be configured to perform one or more particular processing functions.

The data storage device may store, for example, (i) an operating system 712 for the computing device 700; (ii) one or more applications 714 (e.g., computer program code or a computer program product) adapted to direct the CPU 706 in accordance with the systems and methods described here, and particularly in accordance with the processes described in detail with regard to the CPU 706; or (iii) database(s) 716 adapted to store information that may be utilized to store information required by the program.

The operating system 712 and applications 714 may be stored, for example, in a compressed, an uncompiled and an encrypted format, and may include computer program code. The instructions of the program may be read into a main memory of the processor from a computer-readable medium other than the data storage device, such as from the ROM 704 or from the RAM 702. While execution of sequences of instructions in the program causes the CPU 706 to perform the process steps described herein, hard-wired circuitry may be used in place of, or in combination with, software instructions for implementation of the processes of the present invention. Thus, the systems and methods described are not limited to any specific combination of hardware and software.

Suitable computer program code may be provided for performing one or more functions in relation to performing the processes as described herein. The program also may include program elements such as an operating system 712, a database management system and "device drivers" that allow the processor to interface with computer peripheral devices (e.g., a video display, a keyboard, a computer mouse, etc.) via the input/output controller 710.

The term "computer-readable medium" as used herein refers to any non-transitory medium that provides or participates in providing instructions to the processor of the computing device 700 (or any other processor of a device described herein) for execution. Such a medium may take many forms, including but not limited to, non-volatile media and volatile media. Nonvolatile media include, for example, optical, magnetic, or opto-magnetic disks, or integrated circuit memory, such as flash memory. Volatile media include dynamic random access memory (DRAM), which typically constitutes the main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM or EEPROM (electronically erasable programmable read-only memory), a FLASH-EEPROM, any other memory chip or cartridge, or any other non-transitory medium from which a computer can read.

Various forms of computer readable media may be involved in carrying one or more sequences of one or more instructions to the CPU 706 (or any other processor of a device described herein) for execution. For example, the instructions may initially be borne on a magnetic disk of a remote computer (not shown). The remote computer can load the instructions into its dynamic memory and send the instructions over an Ethernet connection, cable line, or even telephone line using a modem. A communications device local to a computing device 700 (e.g., a server) can receive the data on the respective communications line and place the data on a system bus for the processor. The system bus carries the data to main memory, from which the processor retrieves and executes the instructions. The instructions received by main memory may optionally be stored in memory either before or after execution by the processor. In addition, instructions may be received via a communication port as electrical, electromagnetic or optical signals, which are exemplary forms of wireless communications or data streams that carry various types of information.

What is claimed is:

1. A computer-implemented method comprising:
   identifying, at a processor of a first user device of a first user, a document of the first user of the first user device, the document being associated with an interaction;
   determining a plurality of participants associated with the interaction, wherein the determining of the plurality of participants comprises:
     searching for data associated with the interaction;
     determining, using the processor of the first user device, based on the data associated with the interaction, a plurality of calendar events that the first user is scheduled to attend at a current time, wherein each of the plurality of calendar events has a set of scheduled attendees in addition to the first user of the first user device;
     selecting one of the plurality of calendar events with a higher statistical value associated with a number of scheduled attendees being currently proximate to the first user, as compared to other calendar events of the plurality of calendar events;
     adding a set of scheduled attendees of the selected calendar event to the plurality of participants;
   detecting a second user device of a second user, the second user device located proximal to the first user device of the first user, and capable of communicating with the first user device;
   determining that the first user and the second user are participating in the interaction based on the detected proximity between the first user device and the second user device, wherein the second user is not one of the scheduled attendees of the selected calendar event; and
   adding the second user to the plurality of participants;
   displaying a representation of each participant of the plurality of participants on the first user device;
   receiving an identification of at least a subset of the plurality of participants including at least one of the scheduled attendees of the selected calendar event and the second user who is not one of the scheduled attendees of the selected calendar event; and
   causing access to the interaction to be provided to the at least the subset of the plurality of participants.

2. The method of claim 1, wherein each of the participants in the interaction is prompted to download the document from a server.

3. The method of claim 1, wherein causing access to the interaction to be provided to the at least the subset of the plurality of participants comprises creating a link to the document and attaching the link to the calendar event associated with the interaction.

4. The method of claim 1, wherein data associated with the interaction includes one or more of a meeting title, a meeting time, a time of document creation, a meeting location or a list of participants.

5. The method of claim 1, wherein causing access to the interaction to be provided to the at least the subset of the plurality of participants comprises:
   creating an access control list for the interaction with the document, the access control list comprising the at least the subset of the plurality of participants.

6. The method of claim 1, wherein determining that the first user and the second user are participating in the interaction comprises:
   comparing first calendar data of the first user and second calendar data of the second user; and
   determining that there is not a matching calendar event in the first calendar data and the second calendar data.

7. The method of claim 1, further comprising determining additional users for the interaction by detecting other devices proximal to the first user, wherein the additional users proximal to the first user are not included in the data associated with the interaction, and wherein the additional users include the second user.

8. The method of claim 1, further comprising:
   detecting on the first user device a selection of a subset of representations corresponding to the at least the subset of the plurality of participants by the first user; and
   sending a message to each device associated with a participant from the at least the subset of the plurality of participants.

9. A non-transitory computer-readable medium comprising instructions which, when executed by a process of a first user device of a first user, cause the processor to perform operations comprising:
   identifying a document of the first user of the first user device, the document being associated with an interaction;
   determining a plurality of participants associated with the interaction, wherein the determining of the plurality of participants comprises:
     searching for data associated with the interaction;

determining based on the data associated with the interaction, a plurality of calendar events that the first user is scheduled to attend at a current time, wherein each of the plurality of calendar events has a set of scheduled attendees in addition to the first user of the first user device;

selecting one of the plurality of calendar events with a higher statistical value associated with a number of scheduled attendees being currently proximate to the first user, as compared to other calendar events of the plurality of calendar events;

adding a set of scheduled attendees of the selected calendar event to the plurality of participants;

detecting a second user device of a second user, the second user device located proximal to the first user device of the first user, and capable of communicating with the first user device;

determining that the first user and the second user are participating in the interaction based on the detected proximity between the first user device and the second user device, wherein the second user is not one of the scheduled attendees of the selected calendar event; and adding the second user to the plurality of participants;

displaying a representation of each participant of the plurality of participants on the first user device;

receiving an identification of at least a subset of the plurality of participants including at least one of the scheduled attendees of the selected calendar event and the second user who is not one of the scheduled attendees of the selected calendar event; and causing access to the interaction to be provided to the at least the subset of the plurality of participants.

10. The non-transitory computer-readable medium of claim 9, wherein each of the participants in the interaction is prompted to download the document from a server.

11. The non-transitory computer-readable medium of claim 9, wherein causing access to the interaction to be provided to the at least the subset of the plurality of participants comprises creating a link to the document and attaching the link to the calendar event associated with the interaction.

12. The non-transitory computer-readable medium of claim 9, wherein data associated with the interaction includes one or more of a meeting title, a meeting time, a time of document creation, a meeting location or a list of participants.

13. The non-transitory computer-readable medium of claim 9, wherein causing access to the interaction to be provided to the at least the subset of the plurality of participants comprises:
creating an access control list for the interaction with the document, the access control list comprising the at least the subset of the plurality of participants.

14. The non-transitory computer-readable medium of claim 9, wherein determining that the first user and the second user are participating in the interaction comprises:
comparing first calendar data of the first user and second calendar data of the second user; and
determining that there is not a matching calendar event in the first calendar data and the second calendar data.

15. The non-transitory computer-readable medium of claim 9, wherein the operations further comprise determining additional users for the interaction by detecting other devices proximal to the first user, wherein the additional users proximal to the first user are not included in the data associated with the interaction, and wherein the additional users include the second user.

16. The non-transitory computer-readable medium of claim 9, wherein the operations further comprise:
detecting on the first user device a selection of a subset of representations corresponding to the at least the subset of the plurality of participants by the first user; and
sending a message to each device associated with a participant from the at least the subset of the plurality of participants.

17. A system comprising:
a memory to store instructions, and
a processor, coupled to the memory, to execute instructions to perform operations comprising:
identifying a document of the first user of the first user device, the document being associated with an interaction;
determining a plurality of participants associated with the interaction, wherein the determining of the plurality of participants comprises:
searching for data associated with the interaction;
determining based on the data associated with the interaction, a plurality of calendar events that the first user is scheduled to attend at a current time, wherein each of the plurality of calendar events has a set of scheduled attendees in addition to the first user of the first user device;
selecting one of the plurality of calendar events with a higher statistical value associated with a number of scheduled attendees being currently proximate to the first user, as compared to other calendar events of the plurality of calendar events;
adding a set of scheduled attendees of the selected calendar event to the plurality of participants;
detecting a second user device of a second user, the second user device located proximal to the first user device of the first user, and capable of communicating with the first user device;
determining that the first user and the second user are participating in the interaction based on the detected proximity between the first user device and the second user device, wherein the second user is not one of the scheduled attendees of the selected calendar event; and
adding the second user to the plurality of participants;
displaying a representation of each participant of the plurality of participants on the first user device;
receiving an identification of at least a subset of the plurality of participants including at least one of the scheduled attendees of the selected calendar event and the second user who is not one of the scheduled attendees of the selected calendar event; and
causing access to the interaction to be provided to the at least the subset of the plurality of participants.

18. The system of claim 17, wherein each of the participants in the interaction is prompted to download the document from a server.

19. The system of claim 17, wherein causing access to the interaction to be provided to the at least the subset of the plurality of participants comprises creating a link to the document and attaching the link to the calendar event associated with the interaction.

20. The system of claim 17, wherein data associated with the interaction includes one or more of a meeting title, a meeting time, a time of document creation, a meeting location or a list of participants.

\* \* \* \* \*